United States Patent [19]

Spevack

[11] 4,331,513
[45] May 25, 1982

[54] APPARATUS FOR PURIFYING A VAPORIZABLE LIQUID

[75] Inventor: Jerome S. Spevack, New Rochelle, N.Y.

[73] Assignee: Deuterium Corporation, Washington, D.C.

[21] Appl. No.: 111,229

[22] Filed: Jan. 11, 1980

Related U.S. Application Data

[60] Continuation of Ser. No. 823,677, Aug. 11, 1979, abandoned, which is a continuation of Ser. No. 590,071, Jun. 25, 1975, abandoned, which is a division of Ser. No. 497,451, Aug. 14, 1974, Pat. No. 4,008,046, which is a division of Ser. No. 126,623, Mar. 22, 1971, Pat. No. 3,872,223.

[51] Int. Cl.$^3$ .................................................. B01D 3/26
[52] U.S. Cl. ................................. 202/158; 202/186; 202/198; 202/202; 202/270; 203/5; 203/DIG. 19; 423/580
[58] Field of Search ......... 203/98, 5, 87, 99, DIG. 19, 203/DIG. 22; 202/186, 185 R, 198, 179, 161, 162, 158, 270, 182, 202; 423/580

[56] References Cited

U.S. PATENT DOCUMENTS

| | | | |
|---|---|---|---|
| 2,680,708 | 6/1954 | Cook | 202/186 |
| 3,203,227 | 8/1965 | Donnell | 202/185 |
| 3,438,870 | 4/1969 | Roscher et al. | 203/99 |
| 3,445,347 | 5/1969 | Borrel et al. | 203/99 |
| 3,540,987 | 11/1970 | Garkisch et al. | 203/DIG. 19 |
| 3,713,991 | 1/1973 | Thomas | 203/99 |
| 3,725,211 | 4/1973 | Gehrken et al. | 203/99 |
| 3,852,164 | 12/1974 | Chow et al. | 203/99 |
| 4,014,751 | 3/1977 | McCord | 203/99 |
| 4,025,398 | 5/1977 | Haselden | 203/DIG. 19 |

Primary Examiner—Wilbur L. Bascomb, Jr.

[57] ABSTRACT

An apparatus for purifying impure vaporizable liquid, e.g. heavy water, which provides for the removal of dissolved inorganic solid contaminants from such liquid to produce a high purity liquid product.

4 Claims, 1 Drawing Figure

PRODUCT FINISHING

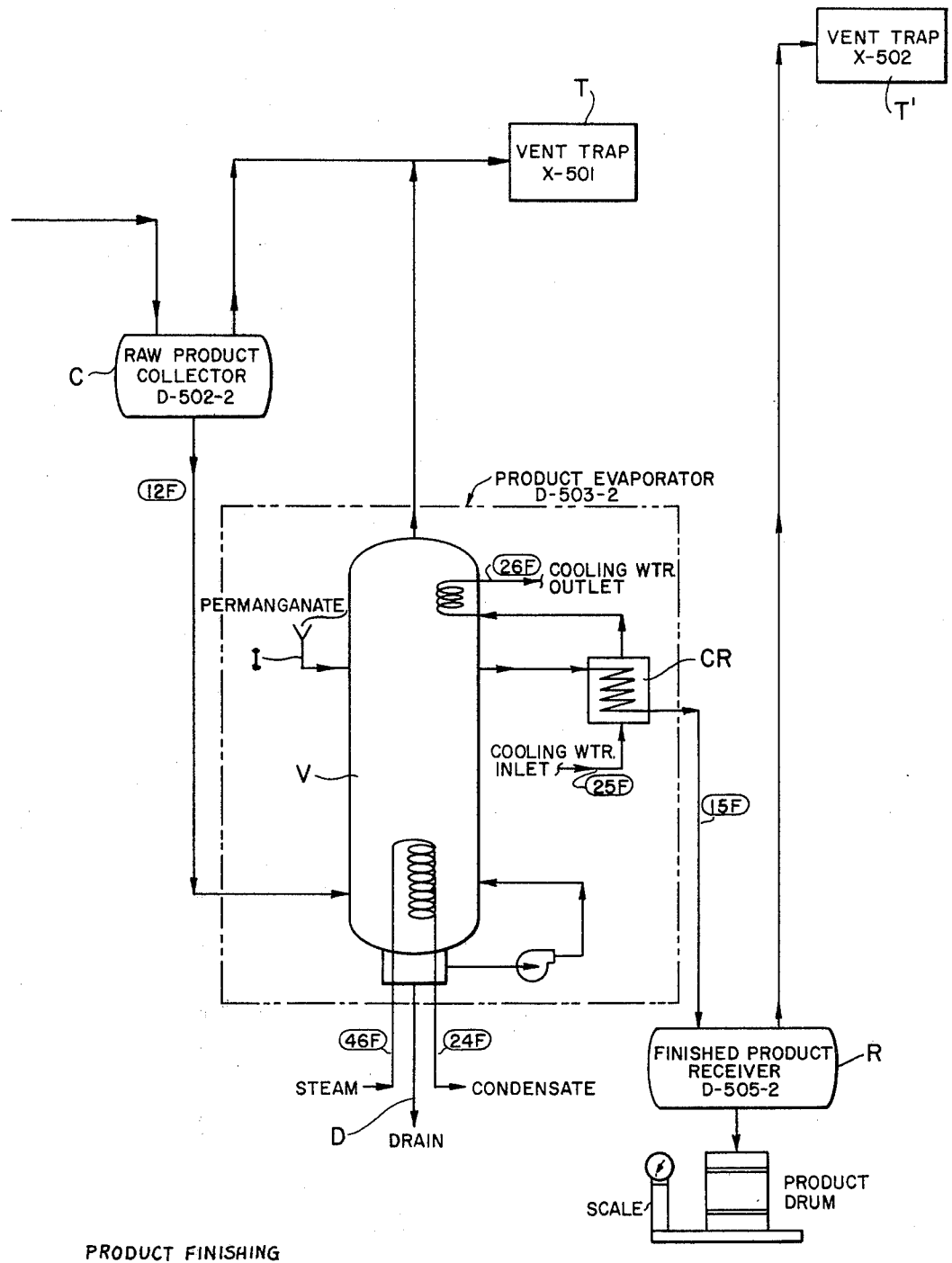
PRODUCT FINISHING

APPARATUS FOR PURIFYING A VAPORIZABLE LIQUID

This is a continuation of application Ser. No. 823,677 filed Aug. 11, 1979 (now abandoned), in turn a continuation of application Ser. No. 590,071 filed June 25, 1975 (now abandoned), itself a division of application Ser. No. 497,451 filed Aug. 14, 1974 (now U.S. Pat. No. 4,008,046 issued Feb. 15, 1977), which in turn is a division of application Ser. No. 126,623 filed Mar. 22, 1971 (now U.S. Pat. No. 3,872,223 issued Mar. 18, 1975).

BACKGROUND OF THE INVENTION

1. Field of Invention

This application relates to the production of deuterium oxide (heavy water) and particularly to a system for purifying a vaporizable liquid such as heavy water which may be incorporated as the product finishing stage of a heavy water production system.

2. Description of the Prior Art

In the prior art, the practice in the production of heavy water has been to conduct the final stages of enrichment by water distillation and/or electrolysis. Statements have been made in the literature that the final enrichment operations might be carried out by the dual temperature exchange process, but such has not actually been performed.

SUMMARY OF THE INVENTION

The present invention aims to provide a system for purifying impure vaporizable liquid, e.g. heavy water which may be produced in accordance with my aforesaid patent applications Ser. No. 126,692 and Ser. No. 126,623 (now U.S. Pat. Nos. 3,860,618 and 3,872,221) for the removal therefrom of dissolved inorganic and/or organic contaminants to provide a pure product.

BRIEF DESCRIPTION OF THE DRAWING

In the accompanying drawing:

The single FIGURE is a flow diagram of a system for purifying a vaporizable liquid, e.g. heavy water, according to this invention.

DESCRIPTION OF PREFERRED EMBODIMENTS

The embodiment shown in the drawing is particularly adapted to receive water and hydrogen sulfide partially enriched in deuterium content by prior stages of a dual temperature exchange system, e.g. the three stage system described in my co-pending application Ser. No. 126,692 filed concurrently herewith (U.S. Pat. No. 3,860,698 issued Jan. 14, 1975), and herein incorporated by reference, whereby enrichment to a concentration of deuterium from about 7 to 15 mol percent, as $D_2O$ is attained, supplemented by fourth and fifth stages as illustrated in my copending application Ser. No. 126,623 (now U.S. Pat. No. 3,872,223, issued Mar. 18, 1975), herein incorporated by reference.

Referring to the accompanying drawing:

The purpose of the product finishing system is to purify the heavy water by distillation and chemical treatment so that it will meet the high-purity requirements. The system preferably consists of two identical sections installed in parallel, so that one may be available for stand-by. Each system includes a raw product heavy water collector C, a heavy water purifying vessel V, and a finished product receiver R. A portable scale is used to weigh the finished product.

The impure heavy water to be purified, e.g. the condensate from 11 in the aforesaid Pat. No. 3,872,223, continuously enters the system at the top of the stainless-steel raw product collector C. During the distillation operation, raw product impure heavy water passes via 12 to vessel V, which is a 30 gallon stainless steel unit consisting of a lower evaporator section, an intermediate section and an upper combined high-purity condenser section. A steam coil H, having supply and discharge means 46 and 24, provides heat for evaporating heavy water vapor from the impure heavy water in said lower evaporator section. As illustrated, circulating means shown as pump 30 with piping 29 and 31 is provided for circulating the impure heavy water in contact with the heater H in said lower section.

Heavy water vapor passes from the evaporator section at the lower part of vessel V, through the intermediate section, to the high-purity condenser section at the upper part of vessel V where it is condensed to liquid condensate which is returned to said lower evaporator section through said intermediate section wherein reflux and backwashing of the vapor in the intermediate section is effected by its countercurrent contact with the condensate formed in the upper condensing section of the vessel V. As illustrated in the drawing, a portion of the so purified vapor is withdrawn from the intermediate section at a location more proximate to said upper section than to said lower section via withdrawal means comprising conduit 27, whereby vapor reaching said location has been purified by traversing a major part of said vapor backwashing intermediate section and condensate formed from purified vapor in said upper section and reaching said lower section has effected said purifying by backwashing all said vapor in said major part of said intermediate section. Said conduit 27 connects to line 15 through an indirect contact condenser CR having a cooling water inlet 25 and the cooled product is passed through a conductivity cell in line 15 (cell not shown) which monitors its purity; a product with higher conductivity, i.e., electrolyte concentration, than is desired is returned to the evaporator section by suitable means (not shown).

Potassium permanganate is added via inlet I to the top of the evaporator section to oxidize any organic matter or other oxidizable contaminants in the raw product delivered from collector C via 12 or otherwise gaining access to the vessel V. The spent permanganate is periodically removed via a drain connection D.

The concentrated product is withdrawn into the finished product receiver. It is periodically discharged into product drums and weighed. The collector C and vessel V and receiver R are vented to refrigerated trap T to prevent loss of valuable heavy water vapor.

While there have been described herein what are at present considered preferred embodiments of the invention, it will be obvious to those skilled in the art that modifications, including changes and omissions and substitutions, may be made without departing from the essence and principle of the invention. It is therefore to be understood that the exemplary embodiments are illustrative and not restrictive of the invention, the scope of which is defined in the appended claims, and that all modifications that come within the meaning and range of equivalency of the claims are intended to be described and included therein.

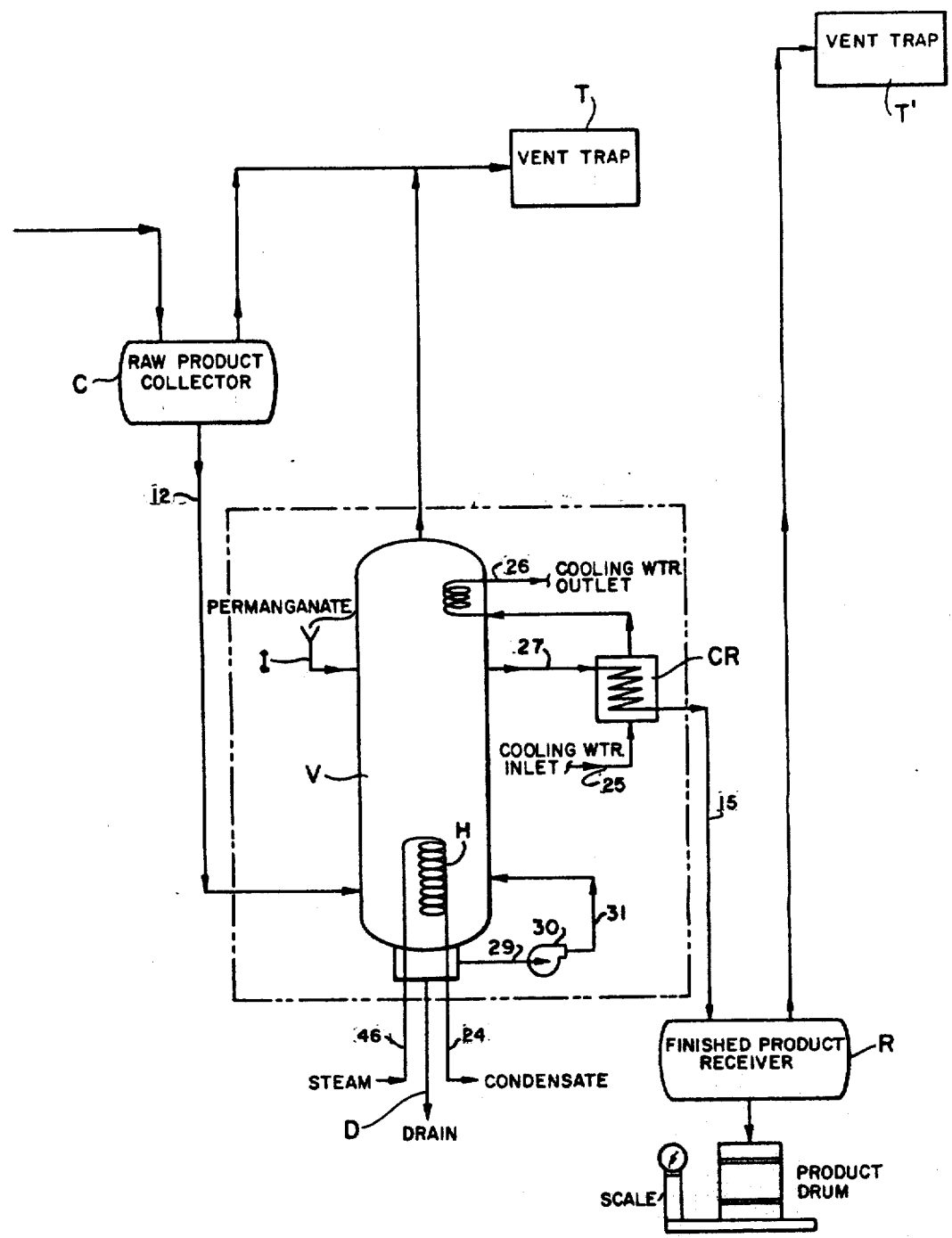

I claim:

1. Apparatus for purifying impure vaporizable liquid which contains dissolved inorganic solids, including in combination:
   (a) a closed vessel comprising
   (1) a vapor producing lower section having a liquid inlet thereat, means connected to said inlet from an external source for introducing said impure vaporizable liquid thereinto, means for heating said impure liquid therein and producing vapor therefrom, and means for removing accumulated inorganic solids therefrom,
   (2) a vapor condensing upper section including therein means for cooling and condensing said vapor to form condensate of said vaporizable liquid, and
   (3) a vapor backwashing intermediate section in communication with said lower section and said upper section and comprising means for passing vapor from said vapor producing section upwardly through said intermediate section to said vapor condensing section and for passing condensate from said vapor condensing section downwardly in countercurrent contact with said upwardly passing vapor and to said vapor producing section, said intermediate section also comprising at a location more proximate to said upper section than to said lower section vapor outlet and withdrawal means for withdrawing a portion of said upwardly passing vapor which at said location has been purified by traversing a major part of said intermediate section in contact with backwashing condensate which has been formed from purified vapor in said upper section,
   (b) said vapor outlet and withdrawal means comprising a conduit connected to said intermediate section at said more proximate location and means for cooling said conduit for condensing said withdrawn purified vapor therein, and
   (c) means for collecting condensate of said vaporizable liquid formed from said purified vapor in said conduit.

2. Apparatus as claimed in claim 1, further comprising means at said lower section of said vessel for circulating said liquid therein in contact with said heating means.

3. Apparatus as claimed in claim 1, said vaporizable liquid being water, further comprising means connected to said vessel for introducing potassium permanganate into the liquid water in the said vessel.

4. Apparatus as claimed in claim 1, further comprising refrigerated trap means, at least one of the said vapor condensing upper section of said vessel and the said condensate collecting means being vented to said refrigerated trap means to prevent loss of vapor of said vaporizable liquid from the apparatus.

* * * * *

UNITED STATES PATENT AND TRADEMARK OFFICE
CERTIFICATE OF CORRECTION

PATENT NO. : 4,331,513

DATED : May 25, 1982

INVENTOR(S) : Jerome S. Spevack

Page 1 of 2

It is certified that error appears in the above—identified patent and that said Letters Patent is hereby corrected as shown below:

Figure 1 should appear as shown on the attached sheet.

Signed and Sealed this

Thirty-first Day of August 1982

[SEAL]

Attest:

Attesting Officer

GERALD J. MOSSINGHOFF

Commissioner of Patents and Trademarks